(12) United States Patent
Park et al.

(10) Patent No.: US 11,385,113 B1
(45) Date of Patent: Jul. 12, 2022

(54) COIL SENSOR-BASED TENSILE FORCE MEASUREMENT SYSTEM CAPABLE OF TEMPERATURE COMPENSATION

(71) Applicant: SMARTINSIDE AI Inc., Suwon-si (KR)

(72) Inventors: Seung Hee Park, Seongnam-si (KR); Won Kyu Kim, Suwon-si (KR)

(73) Assignee: SMARTINSIDE AI Inc., Suwon-si (KR)

( * ) Notice: Subject to any disclaimer, the term of this patent is extended or adjusted under 35 U.S.C. 154(b) by 0 days.

(21) Appl. No.: 17/687,572

(22) Filed: Mar. 4, 2022

(30) Foreign Application Priority Data

Mar. 11, 2021 (KR) ......................... 10-2021-0032085

(51) Int. Cl.
*G01L 5/04* (2006.01)
*G01K 7/22* (2006.01)

(52) U.S. Cl.
CPC . *G01L 5/04* (2013.01); *G01K 7/22* (2013.01)

(58) Field of Classification Search
CPC .................................. G01L 5/04; G01K 7/22
See application file for complete search history.

(56) References Cited

U.S. PATENT DOCUMENTS

| | | | | |
|---|---|---|---|---|
| 7,953,562 B2* | 5/2011 | Bulte | ...................... | G01L 1/125 702/42 |
| 9,134,188 B2* | 9/2015 | May | .......................... | G01L 1/12 |
| 10,868,867 B2* | 12/2020 | Binder | .................... | H04L 67/12 |
| 11,336,726 B2* | 5/2022 | Binder | .................... | H04L 67/12 |
| 2005/0192727 A1* | 9/2005 | Shostak | ............... | G07C 5/0808 701/1 |
| 2009/0001974 A1* | 1/2009 | Sheiretov | ................ | G01L 5/164 324/232 |
| 2013/0014589 A1* | 1/2013 | Sheiretov | ................ | G01L 5/164 73/765 |
| 2013/0201316 A1* | 8/2013 | Binder | ................... | H04L 67/12 701/2 |
| 2020/0294401 A1* | 9/2020 | Kerecsen | ............ | G05D 1/0287 |

FOREIGN PATENT DOCUMENTS

| | | |
|---|---|---|
| JP | 2017-134013 A | 8/2017 |
| KR | 10-2020-0072633 A | 6/2020 |

* cited by examiner

*Primary Examiner* — Nathaniel T Woodward
*Assistant Examiner* — Philip L Cotey
(74) *Attorney, Agent, or Firm* — Patent Office of Dr. Chung Park

(57) ABSTRACT

Disclosed herein is a coil sensor-based tensile force measurement system capable of temperature compensation. The coil sensor-based tensile force measurement system includes: a coil sensor configured to magnetize an inspection target object, and to detect information about a magnetic flux density formed by the magnetized inspection target object; a thermistor disposed to detect the temperature of a place where the coil sensor is installed; and a tensile force measurement server configured to acquire magnetic hysteresis curve information based on the temperature for the inspection target object, based on information collected by the coil sensor and the thermistor.

2 Claims, 2 Drawing Sheets

COIL SENSOR-BASED TENSILE FORCE MEASUREMENT SYSTEM CAPABLE OF TEMPERATURE COMPENSATION

CROSS-REFERENCE TO RELATED APPLICATION

This application claims the benefit of Korean Patent Application No. 10-2021-0032085 filed on Mar. 11, 2021, which is hereby incorporated by reference herein in its entirety.

BACKGROUND

1. Technical Field

The present invention relates generally to a coil sensor-based tensile force measurement system capable of temperature compensation, and more particularly to a system capable of accurately estimating tensile force in a current environment via a temperature compensation algorithm based on machine learning.

2. Description of the Related Art

In the design of concrete bridges and high-rise buildings, a post-tensioning (PT) method or a fixing method using lock bolts is widely used.

A post-tensioning method increases the strength of a structure by applying pre-stress to the structure by using tendons configured in bundles.

The tensile force of a tendon in the post tensioning method and a lock bolt in the fixing method using lock bolts may gradually be relaxed over time. Due to the relaxation of tensile force in the structure, the safety of the structure may be endangered. In order to prevent this problem, it is necessary to develop a technology for accurately monitoring the tensile force of a tendon or lock bolt and preventing damage to a structure attributable to the relaxation of the tensile force.

In response to this need, various studies are being conducted to accurately measure the tensile force of a tendon mounted in a structure. As representative technology for monitoring the relaxation of tensile force, techniques using an electromagnetic sensor, an optical fiber sensor, or an elongation sensor have been proposed.

Among them, the technique using an electromagnetic sensor is used in the form in which a tendon is passed through the center of the cylindrical electromagnetic sensor. To secure a sufficient measurement resolution, the tendon is magnetized by generating a strong magnetic field. In this case, since a power of several hundred watts is instantaneously required to magnetize the tendon, large-sized equipment is necessary, and this technique has a limitation in terms of practicality for use at an actual civil structure construction site.

Furthermore, a magnetic hysteresis curve formed by the magnetized tendon is significantly sensitive to temperature. For example, in the case of a structure such as a tunnel, since a change in temperature inside the tunnel is considerably large, it is impossible to accurately measure tensile force based on temperature when the measurement of tensile force is performed by the above method.

Therefore, there is a demand for technology capable of accurately measuring tensile force even when a change in temperature occurs.

SUMMARY

An object of the present invention is to overcome the problems of the conventional technologies described above.

An object of the present invention is to enable accurate tensile force to be estimated based on temperature-compensated magnetic hysteresis curve-related information even for an inspection target object installed in a site where a change in temperature is severe.

The objects of the present invention are not limited to the objects described above, and other objects not described above will be clearly understood from the following description.

According to an aspect of the present invention, there is provided a coil sensor-based tensile force measurement system capable of temperature compensation, the coil sensor-based tensile force measurement system including: a coil sensor configured to magnetize an inspection target object, and to detect information about a magnetic flux density formed by the magnetized inspection target object; a thermistor disposed to detect the temperature of a place where the coil sensor is installed; and a tensile force measurement server configured to acquire magnetic hysteresis curve information based on the temperature for the inspection target object, based on information collected by the coil sensor and the thermistor.

The tensile force measurement server may execute a machine learning algorithm based on a database that is constructed based on the magnetic hysteresis curve information based on the temperature.

The tensile force measurement server may execute a machine learning algorithm based on data on the resistance value of the thermistor based on the temperature.

The tensile force measurement server may acquire temperature-compensated magnetic hysteresis curve information for the estimation of the tensile force of the inspection target object, based on magnetic hysteresis curve information generated based on the information acquired by the coil sensor and temperature information determined based on the information acquired by the thermistor.

According to another aspect of the present invention, there is provided a coil sensor-based tensile force measurement system capable of temperature compensation, the coil sensor-based tensile force measurement system including: a temperature-based magnetic hysteresis curve acquisition unit configured to acquire magnetic hysteresis curve information based on a temperature for an inspection target object, based on information collected by a coil sensor, configured to magnetize the inspection target object and detect information about a magnetic flux density formed by the magnetized inspection target object, and a thermistor; a temperature-based thermistor resistance value acquisition unit configured to acquire a resistance value change pattern based on the temperature of the thermistor; a machine learning performance unit configured to execute a machine learning algorithm via databases constructed by the temperature-based magnetic hysteresis curve acquisition unit and the temperature-based thermistor resistance value acquisition unit; and a temperature-compensated magnetic hysteresis curve acquisition unit configured to acquire temperature-compensated magnetic hysteresis curve information for each inspection target object through learning performed by the machine learning performing unit.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
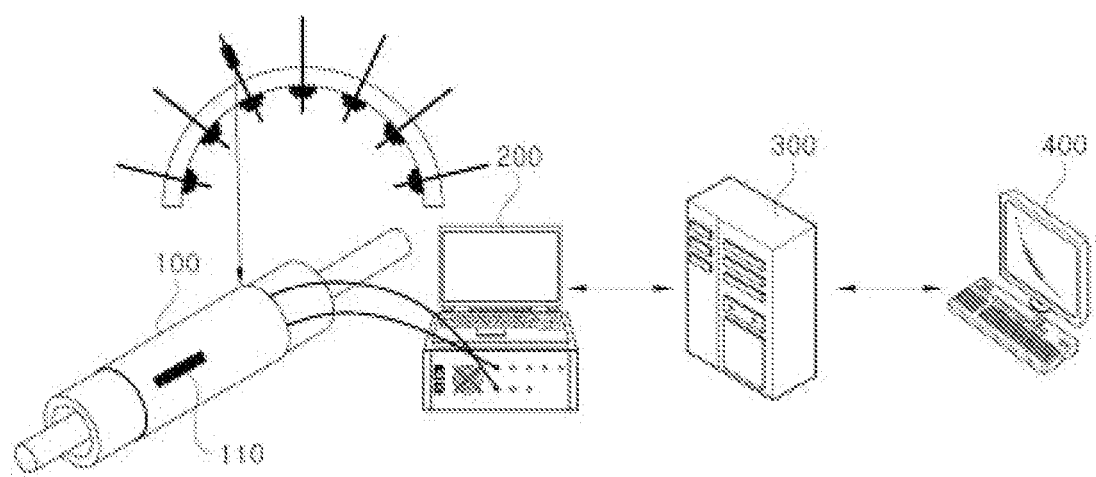
FIG. 1 is a drawing showing the configuration of a coil sensor-based tensile force measurement system capable of temperature compensation according to an embodiment of the present invention.

For the following detailed description of the present invention, reference is made to the accompanying drawings that show by way of illustration specific embodiments via which the present invention may be practiced. These embodiments will be described in sufficient detail to enable those skilled in the art to practice the present invention. It should be understood that various embodiments of the present invention are different but are not necessarily mutually exclusive. For example, a specific shape, structure, and/or feature described herein may be implemented as another embodiment without departing from the spirit and scope of the invention with respect to one embodiment. In addition, it should be understood that the locations or arrangement of individual components within each disclosed embodiment may be changed without departing from the spirit and scope of the present invention. Accordingly, the following detailed description is not intended to be taken in a limiting sense, and the scope of the present invention, together with all ranges equivalent to the appended claims if appropriately described, is limited only by the appended claims. Like reference numerals in the drawings refer to the same or similar functions throughout various aspects.

The embodiments of the present invention will be described in detail below with reference to the accompanying drawings so that those of ordinary skill in the art to which the present invention pertains can easily practice the present invention.

FIG. 1 is a drawing showing the configuration of a coil sensor-based tensile force measurement system capable of temperature compensation according to an embodiment of the present invention.

Referring to FIG. 1, the coil sensor-based tensile force measurement system according to the present embodiment may include a coil sensor 100, a control system 200, a tensile force measurement server 300, and a user terminal 400.

The control system 200, the tensile force measurement server 300, and the user terminal 400 may communicate over an intercommunication network, e.g., a LoRa communication network, a mobile communication network, a local area network (LAN), a metropolitan area network (MAN), a wide area network (WAN), the World Wide Web (WWW), and/or a wireless fidelity (Wi-Fi) communication network.

The coil sensor 100 is disposed to surround a lock bolt, a steel rod, or another member (e.g., a lock bolt installed in a tunnel structure) installed in one of various structures.

The coil sensor 100 may have a double coil structure. When power is supplied from the control system 200, a current flow in a first coil (a primary coil), so that a magnetic field is formed. An inspection target object surrounded by the coil sensor 100 is magnetized by the magnetic field, and thus lines of magnetic force are formed around it. The density of these lines of magnetic force varies depending on the tensile force of an inspection target object. This magnetic flux density is detected by a second coil (a secondary coil) provided in the coil sensor 100.

Meanwhile, according to an embodiment of the present invention, the coil sensor 100 further includes a thermistor 110. The thermistor 110 is a component designed such that the electrical resistance thereof varies depending on temperature. The control system 200 may check the temperature of a place where the coil sensor 100 is currently installed by supplying power to the thermistor 110 and measuring the resistance of the thermistor 110. Although the thermistor 110 is illustrated as being attached to the surface of the coil sensor 100 in FIG. 1, it is sufficient if the thermistor 110 is disposed on another part of the coil sensor 100 or adjacent to the coil sensor 100. The thermistor 110 may be attached to the first coil provided for the purpose of magnetizing an inspection target object, and may serve to determine how contraction and expansion attributable to a change in the temperature of the coil affect the magnetization of the inspection target object.

The control system 200 supplies power to the first coil of the coil sensor 100, receives magnetic flux density-related information detected by the second coil, and estimates the tensile force of an inspection target object using the received information by itself, or transmits the magnetic flux density information and detected temperature information, received from the coil sensor 100, to the tensile force measurement server 300.

The tensile force measurement server 300 constructs a database for the unique magnetic hysteresis curve of the inspection target object and a temperature-based magnetic hysteresis curve based on the information received from the control system 200. Each material such as iron has a magnetization strength change characteristic depending on the strength of an external magnetic field. A magnetic hysteresis curve representative of this change characteristic may have been previously stored by the tensile force measurement server 300 itself, or may be obtained through the information detected by the coil sensor 100 for an inspection target object in which a reduction in tensile force has not occurred. In addition, the tensile force measurement server 300 may estimate the temperature of a place where the coil sensor 100 is installed through the information transmitted by the thermistor 110, or may obtain the temperature information found by the control system 200 and also obtain information about the change pattern of the magnetic hysteresis curve of an inspection target object based on a change in temperature.

Furthermore, the tensile force measurement server 300 also constructs a database for a pattern in which the resistance of the thermistor 110 varies depending on temperature.

Based on the databases constructed as described above, the tensile force measurement server 300 may obtain a magnetic hysteresis curve, specifically a magnetic hysteresis curve in which a characteristic based on a change in temperature is compensated for, for an inspection target object based on a machine learning algorithm, and may measure the tensile force of the inspection target object through received magnetic flux density information for the inspection target object.

The user terminal 400 may receive information about the tensile force of each inspection target object which is calculated by the tensile force measurement server 300 and the magnetic hysteresis curve information to which temperature compensation for the inspection target object is applied, and may display the received information in a form which can be checked by an administrator.

The user terminal 400 has a computation function, and may be implemented in any form as long as it is a device capable of communicating with the outside. For example, the user terminal 400 may be implemented as a smartphone, a tablet personal computer (PC), a desktop, a laptop, a notebook, a personal digital assistant (PDA), or the like, but is not limited thereto.

Figure 2:
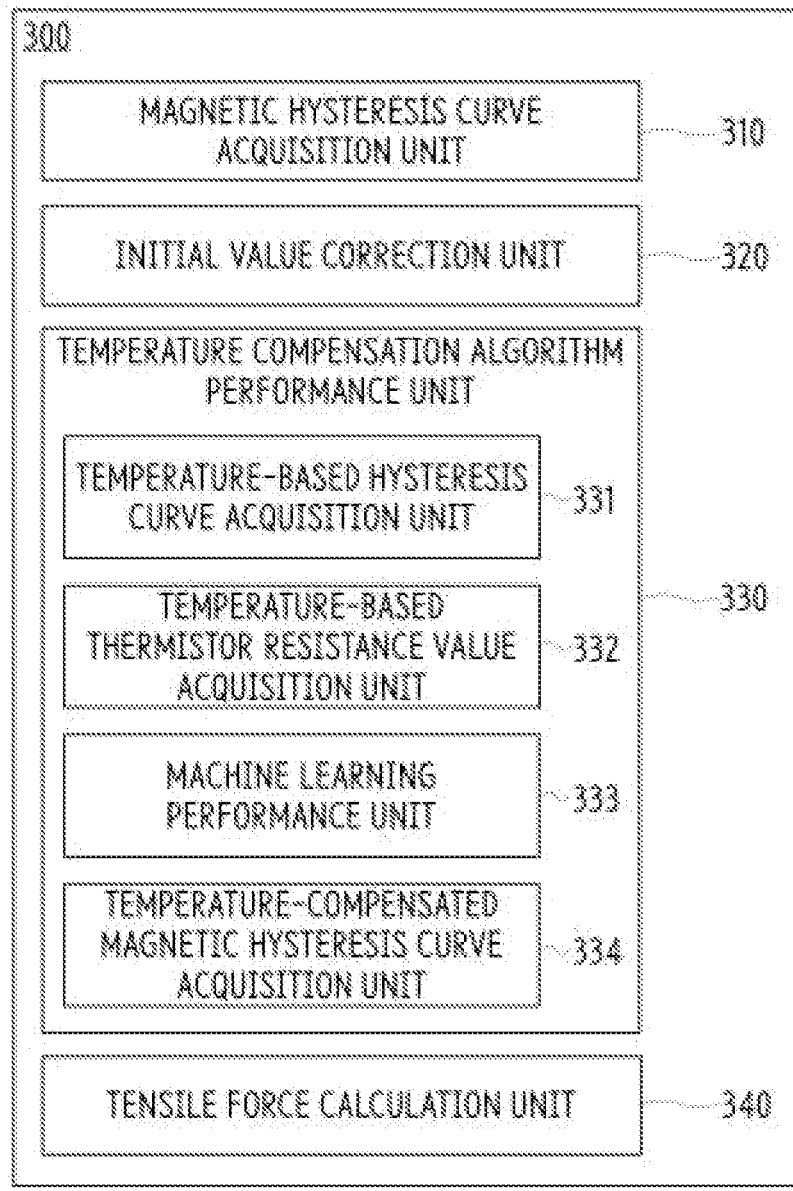
FIG. 2 is a block diagram illustrating in detail the operation and configuration of a tensile force measurement server according to an embodiment of the present invention.

FIG. 2 is a block diagram illustrating in detail the operation and configuration of a tensile force measurement server according to an embodiment of the present invention.

Referring to FIG. 2, the tensile force measurement server 300 may include a magnetic hysteresis curve acquisition unit 310, an initial value correction unit 320, a temperature compensation algorithm performance unit 330, and a tensile force calculation unit 340.

The magnetic hysteresis curve acquisition unit 310, the initial value correction unit 320, the temperature compensation algorithm performance unit 330, and the tensile force calculation unit 340 may be program modules or hardware capable of communicating with external devices. The program modules or hardware may be included in the tensile force measurement server 300 in the form of an operating system, application program modules, or other program modules, and may physically be stored in various types of known storage devices. Meanwhile, these program modules or hardware include, but are not limited to, routines, subroutines, programs, objects, components, and/or data structures that perform specific tasks to be described later or execute specific abstract data types according to the present invention.

The hysteresis curve acquisition unit 310 serves to acquire the unique hysteresis curve of each inspection target object. The unique hysteresis curve may be obtained by the tensile force measurement server 300 from the information transmitted by an external server or the user terminal 400, or may be obtained from the information detected by the coil sensor 100 installed on each inspection target object.

In this case, information about the strength of a magnetic field applied to each inspection target object and information about the magnetic flux density formed as a result of the resulting magnetization of the inspection target object may be received together from the coil sensor 100 or the control system 200. Through this, the magnetic hysteresis curve information of each inspection target object may be obtained.

Furthermore, information about the power applied to the thermistor 110 and the resistance information of the thermistor 110 may be received from the thermistor 110 or the control system 200, and the temperature of a place where the coil sensor 100 is installed may be estimated. In other words, information about the magnetic hysteresis curve of an inspection target object for each temperature may be obtained.

The initial value correction unit 320 serves to correct the magnetic hysteresis curve of each inspection target object based on the area ratio of the magnetic hysteresis curve based on tensile force for the inspection target object. Since the tensile force of each inspection target object is estimated based on the area ratio of the magnetic hysteresis curve in the future, the initial correction of the tensile force and area ratio of each inspection target object is required.

The temperature compensation algorithm performance unit 330 constructs a database for the magnetic hysteresis curve change pattern of an inspection target object based on temperature and a database for a change in the resistance of the thermistor 110 based on temperature, and then obtains the magnetic hysteresis curve of each inspection target object based on training data, specifically a hysteresis curve in which the effect of temperature has been compensated for, by executing a machine learning algorithm based on the above information.

To this end, the temperature compensation algorithm performance unit 330 may include a temperature-based hysteresis curve acquisition unit 331, a temperature-based thermistor resistance value acquisition unit 332, a machine learning performance unit 333, and a temperature-compensated magnetic hysteresis curve acquisition unit 334.

The temperature-based hysteresis curve acquisition unit 331 acquires temperature-based magnetic hysteresis curve information based on the magnetic hysteresis curve of each inspection target object acquired by each coil sensor 100 and a temperature value acquired based on the information detected by the thermistor 110. More specifically, a magnetic hysteresis curve forms a closed curve, and a database for the area change pattern of the closed curve based on a change in temperature is constructed.

The temperature-based thermistor resistance value acquisition unit 332 constructs a database for the resistance value change pattern of the thermistor 110 based on the temperature of a place where the thermistor 110 is installed.

The machine learning performance unit 333 executes a machine learning algorithm via the databases constructed by the temperature-based hysteresis curve acquisition unit 331 and the temperature-based thermistor resistance value acquisition unit 332.

The present invention adopts a learning method using a deep learning technique, which is a type of machine learning. Machine learning is a branch of artificial intelligence, and has evolved from studies of pattern recognition and computer learning theories.

Machine learning improves a knowledge base by using surrounding environments as training elements. A specific task is performed using the improved knowledge base, and the information obtained during the performance of the task is reflected in the training elements again. Machine learning is a technique that studies and constructs a system and algorithm for performing learning based on empirical data in the above manner, making predictions, and improving its own performance. Machine learning algorithms use a method of constructing a specific model to make a prediction or decision based on input data.

Machine learning may be classified into a method of rote learning and direct provision of new knowledge, a supervised learning method, a learning-by-analogy method, and an inductive learning method according to their learning strategies. The present invention may use at least one of the above learning methods.

Through the above-described learning, information related to the magnetic hysteresis curve of each inspection target object based on temperature may be acquired, and the resistance change pattern of the thermistor based on temperature may be accurately acquired.

The temperature-compensated magnetic hysteresis curve acquisition unit 334 acquires temperature-compensated magnetic hysteresis curve information for each inspection target object through the learning performed by the machine learning performance unit 333.

Through the learning process described above, the current temperature of a place where the coil sensor 100 is installed may be accurately predicted through the resistance value of the thermistor 110, and magnetic hysteresis curve-related information, i.e., information about a magnetic hysteresis curve area, in a steady state at a current temperature in each inspection target object may be accurately predicted.

The tensile force calculation unit 340 may predict the tensile force of an inspection target object based on a result acquired by the temperature-compensated magnetic hysteresis curve acquisition unit 334 and the detection information collected from the coil sensor 100 and the thermistor 110. This may be performed by referring to information about the area ratio of a magnetic hysteresis curve to the tensile force of each inspection target object.

According to an embodiment of the present invention, an accurate tensile force may be estimated based on temperature-compensated magnetic hysteresis curve-related information even for an inspection target object installed in a site where a change in temperature is severe.

The foregoing description of the present invention is intended for illustration purposes. It will be understood by those of ordinary skill in the art to which the present invention pertains that each of the embodiments described above may be easily modified into other specific forms without changing the technical spirit or essential features of the present invention. Accordingly, it should be understood that the embodiments described above are illustrative but not restrictive in all respects. For example, each component described as being in a single form may be implemented in a distributed form, and, likewise, components described as being in a distributed form may also be implemented in an integrated form.

The scope of the present invention is defined by the attached claims, and all variations or modifications derived from the meanings and scope of the claims and their equivalents should be construed as falling within the scope of the present invention.

What is claimed is:

1. A coil sensor-based tensile force measurement system capable of temperature compensation, the coil sensor-based tensile force measurement system comprising:
   a coil sensor configured to magnetize an inspection target object, and to detect information about a magnetic flux density formed by the magnetized inspection target object;
   a thermistor disposed to detect a temperature of a place where the coil sensor is installed; and
   a tensile force measurement server configured to acquire magnetic hysteresis curve information based on the temperature for the inspection target object, based on information collected by the coil sensor and the thermistor,
   wherein the tensile force measurement server comprises a temperature-based magnetic hysteresis curve acquisition unit configured to construct a database for a closed curve area change pattern of a magnetic hysteresis curve based on a temperature for an inspection target object, based on a magnetic hysteresis curve of the inspection target object acquired by the coil sensor and a temperature value acquired based on information detected by the thermistor;
   a temperature-based thermistor resistance value acquisition unit configured to construct a database for a thermistor resistance value change pattern based on a temperature of a place where the thermistor is installed; and
   a machine learning performance unit configured to execute a machine learning algorithm based on the databases constructed by the temperature-based magnetic hysteresis curve acquisition unit and the temperature-based thermistor resistance value acquisition unit in order to make a temperature prediction based on a thermistor resistance value and acquire temperature-compensated magnetic hysteresis curve information for an inspection target object.

2. A coil sensor-based tensile force measurement system capable of temperature compensation, the coil sensor-based tensile force measurement system comprising:
   a temperature-based magnetic hysteresis curve acquisition unit configured to construct a database for a closed curve area change pattern of a magnetic hysteresis curve based on a temperature for an inspection target object, based on a magnetic hysteresis curve of the inspection target object acquired by a coil sensor configured to magnetize an inspection target object and detect information about a magnetic flux density formed by the magnetized inspection target object and a temperature value acquired based on information collected by a thermistor;
   a temperature-based thermistor resistance value acquisition unit configured to construct a database for a thermistor resistance value change pattern based on a temperature of a place where the thermistor is installed;
   a machine learning performance unit configured to execute a machine learning algorithm based on the databases constructed by the temperature-based magnetic hysteresis curve acquisition unit and the temperature-based thermistor resistance value acquisition unit in order to make a temperature prediction based on a thermistor resistance value and acquire temperature-compensated magnetic hysteresis curve information for an inspection target object; and
   a temperature-compensated magnetic hysteresis curve acquisition unit configured to make a temperature prediction based on a thermistor resistance value and also acquire temperature-compensated magnetic hysteresis curve information for each inspection target object through learning performed by the machine learning performing unit.

* * * * *